Aug. 14, 1962
R. J. MAIER
3,049,207
CLUTCH
Filed Oct. 14, 1959
4 Sheets-Sheet 1
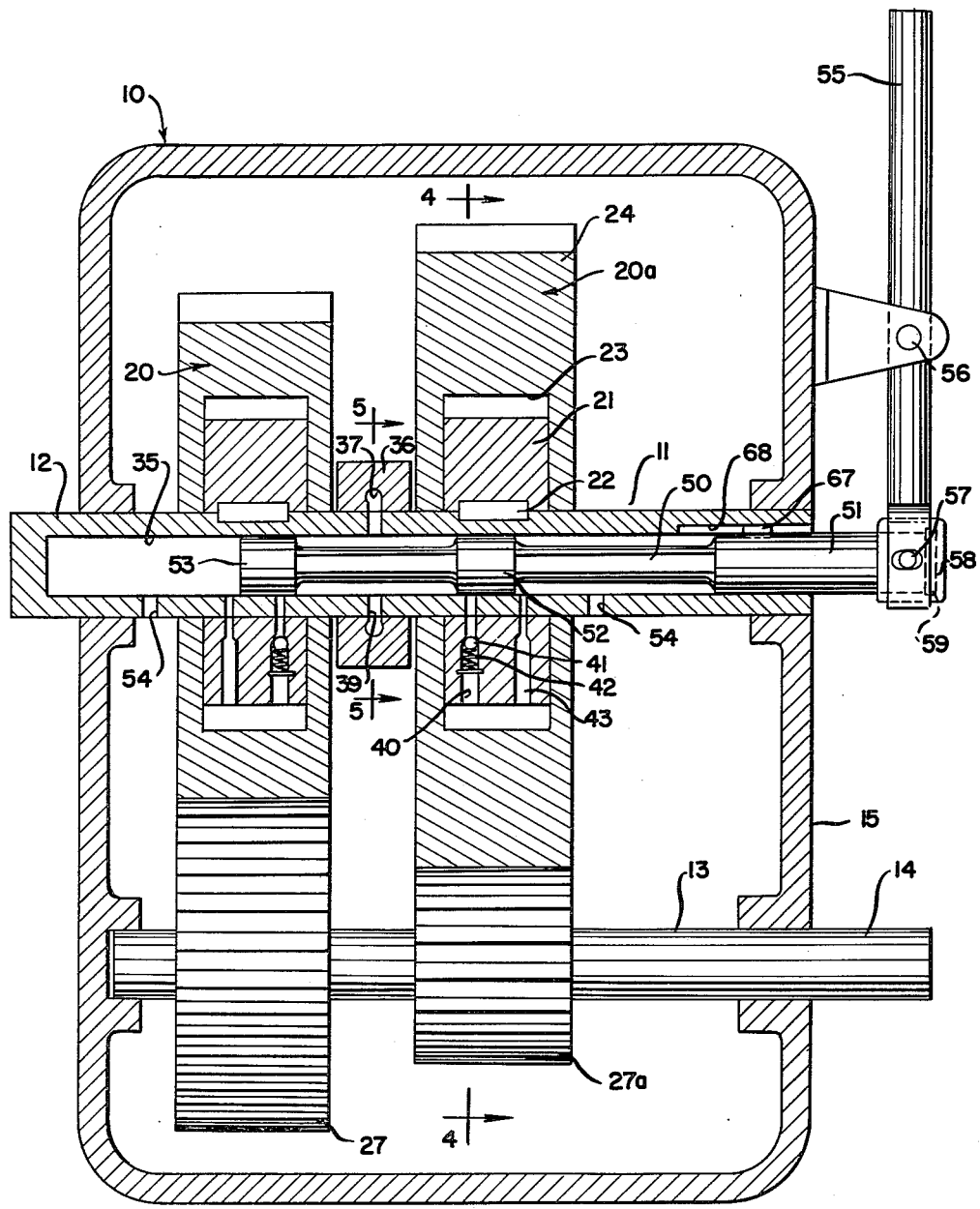
FIG_1
*INVENTOR.*
RICHARD J. MAIER
BY
Cullen & Cantor
ATTORNEYS

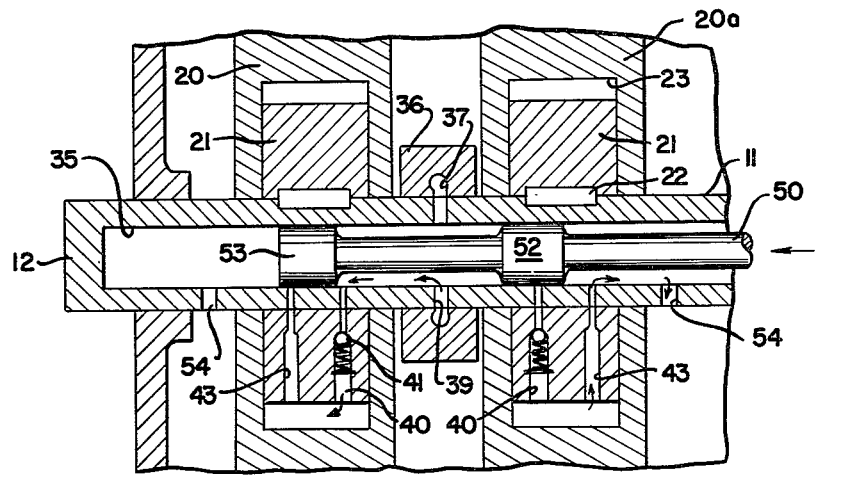
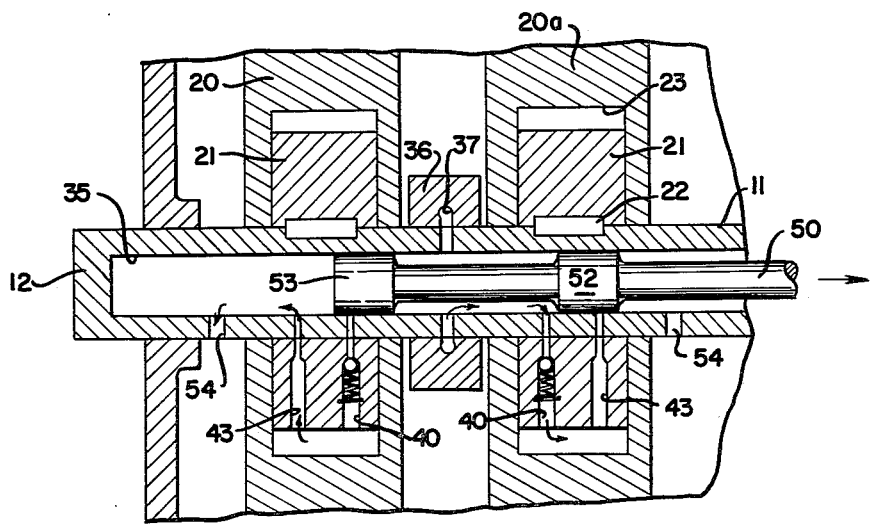

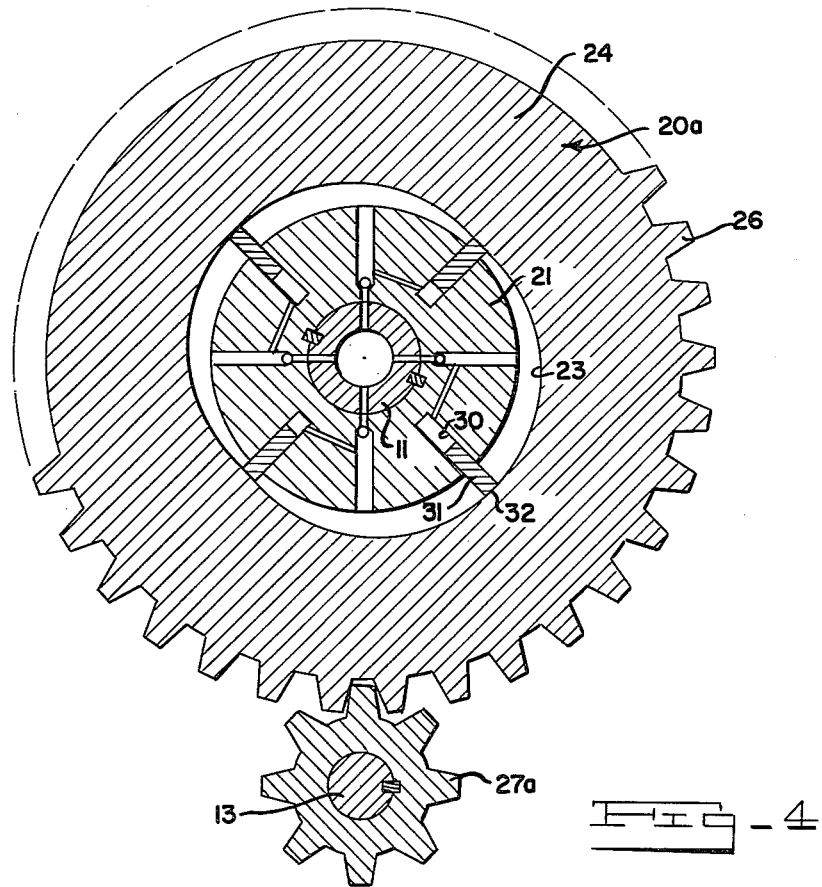
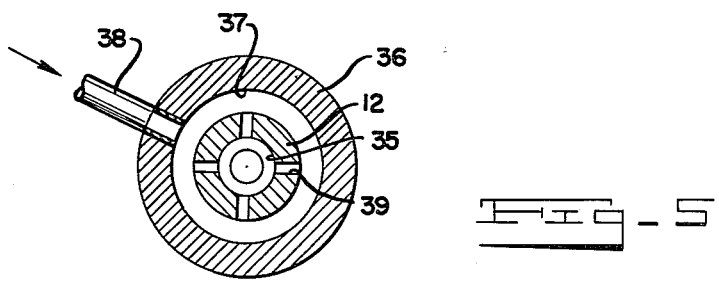

Aug. 14, 1962 R. J. MAIER 3,049,207
CLUTCH
Filed Oct. 14, 1959 4 Sheets-Sheet 4
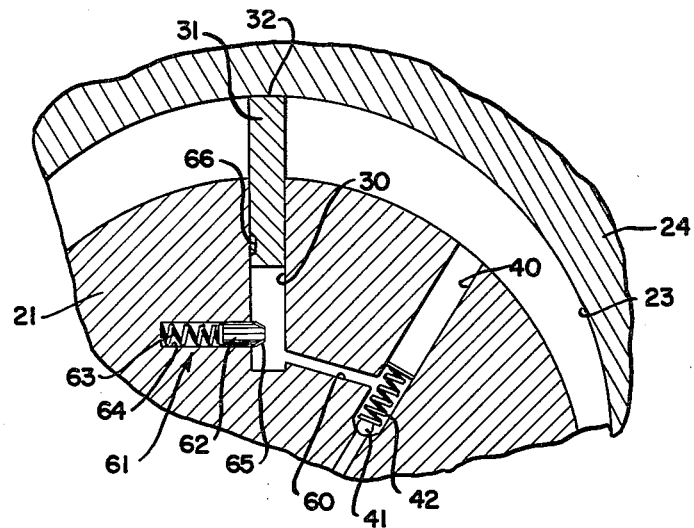
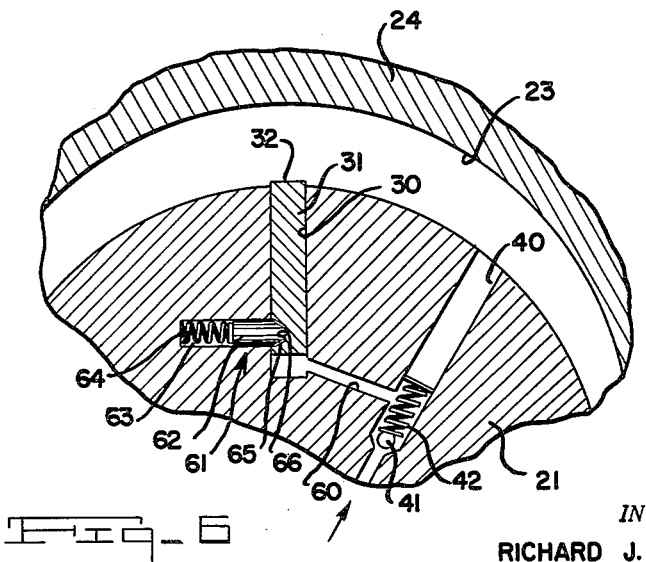
INVENTOR.
RICHARD J. MAIER
BY Cullen & Cantor
ATTORNEYS

# United States Patent Office 3,049,207
Patented Aug. 14, 1962

3,049,207
CLUTCH
Richard J. Maier, 16924 Muirland, Detroit 21, Mich., assignor of fifty percent to George Simon, Detroit, Mich.
Filed Oct. 14, 1959, Ser. No. 846,398
1 Claim. (Cl. 192—58)

This invention relates to a clutch and more particularly to a rotary hydraulic clutch mechanism.

This invention is concerned with the rotary type of hydraulic clutches having a rotor mounted upon a shaft and outwardly slidable vanes which function to block the passage of a fluid and to lock the rotor to an outer housing, which surrounds it, by means of fluid pressure wherein the housing rotates with the rotor and upon release of pressure, the rotor rotates and the housing is stationary relative thereto.

In such a construction, it is an object of this invention to provide a means for positively ejecting the vanes outwardly and for holding the ends of the vanes in contact with the housing by fluid pressure.

A further object is to provide a means for locking the vanes in a retracted position within the rotor so that when the clutch is disengaged, the vanes do not resist the rotary motion of the rotor within the housing.

A further object of this invention is to provide a dual clutch mechanism having two separate clutches with a valving system for actuating one or the other of the clutches which system is completely located within the drive shaft upon which the clutches are mounted so as to simplify the mechanism, and reduce wear and maintenance, etc.

These and other objects and advantages of this invention will become apparent upon reading the following description of which the attached drawings form a part.

In these drawings:

FIG. 1 is a cross-sectional elevational view of the dual clutch mechanism.

FIG. 2 is a cross-sectional view showing the valve in one position.

FIG. 3 is a view similar to FIG. 2 and shows the valve in a second position.

FIG. 4 is a cross-sectional view of one clutch taken in the direction of arrows 4—4 of FIG. 1.

FIG. 5 is a view taken in the direction of arrows 5—5 of FIG. 1.

FIG. 6 is an enlarged, cross-sectional view of a fragment of the clutch and shows the vane retracted and held by a detent means.

FIG. 7 is a view similar to FIG. 6 but shows the vane extending outwardly of the rotor.

Referring first to FIG. 1, the dual clutch mechanism generally designated as 10, includes a drive shaft 11 having a drive shaft end 12 which may be connected to a power source such as an internal combustion engine or a motor or the like. It also has a driven shaft 13 having a power take off end 14. The two shafts are arranged near each other and parallel to one another within a casing 15 within which the shafts are journaled for rotation.

A pair of clutches 20 and 20a are mounted upon the drive shaft 12. These clutches are identical in all respects except that one has a housing which has a greater outside diameter than the other for reasons to be explained below.

Each clutch includes a rotor 21 which is keyed to the drive shaft 11 by means of a key 22 (see FIGS. 1 and 4). The rotor fits within and is completely enclosed by a chamber 23 formed in the clutch housing 24. The chamber is formed with curved walls which are not parallel to the curvature of the outer periphery of the rotor so that portions of the curved walls of the chamber are located close to the periphery of the rotor while other portions are spaced a distance from the periphery of the rotor.

Each rotor is provided with a number of pockets 30 which are radially arranged relative to the axis of the rotor and which open outwardly into the chamber 23. A vane 31 is fitted into each of the pockets with the vane being slidable inwardly and outwardly of the pockets so that the free ends 32 of each of the vanes may contact the wall defining the chamber 23 as the rotor rotates within the chamber.

Each housing 24 is rotatably mounted upon the shaft 11 so as to rotate relative to the shaft. Thus, as the shaft rotates, the housing may be stationary. The housings are provided with gear teeth 26 which engage the teeth of gears 27 and 27a respectively, which gears are keyed to the shaft 13 so as to rotate with that shaft. Hence, as the drive shaft 11 rotates, with nothing further, the rotors rotate within their chambers 23 and the two housings 20 and 20a, gears 27 and 27a, and shaft 13 remain stationary.

In order to rotate the shaft 13, either one of the two housings 20 or 20a may be rotated by locking it to its respective rotor.

The shaft 12 is hollowed out to form a hollow interior 35. A collar 36 surrounds the shaft between the two clutches, with the collar being stationary, that is, not rotatable with the shaft. The collar is provided with an internal continuous groove 37 into which a feed pipe 38 is connected (see FIG. 5). Fluid under pressure is fed into the groove 37 from a conventional pump, which pumps a fluid such as oil or the like into the groove. The pump is not shown or described since it is conventional and well known in the art.

The shaft is provided with a number of openings 39 so that the pressurized fluid may enter the hollow interior of the shaft. Thus, despite the fact that the shaft is rotating relative to the collar, fluid is forced into the interior of the shaft through the opening 39 from the groove 37.

Each of the rotors is provided with a number of feed passageways 40 which communicate the hollow interior of the shaft to the chambers 23 in the housings. These passageways may be provided with a ball and seat type of check valve 41, wherein the ball is spring urged by means of a spring 42 into a constricted shoulder or portion of the passageway and acts to prevent fluid from escaping back from the chamber to the shaft. Also, the rotors are provided with exit ports 43 likewise communicating the hollow interior of the shaft to the chamber.

Each feed passageway has an exit port arranged next to it, as shown in FIG. 1. (Note: In FIG. 4 the exit ports would be in back of each feed passageway and hence do not show in that figure.)

A valve means is provided to direct the flow of pressurized fluid into either or none of the two clutches mounted upon the shaft. This valve means includes a spool 50 which is in the form of an elongated shaft of a considerably smaller diameter than the diameter of the opening through the drive shaft. The spool end 51 extends outwardly through an opening in the end of the drive shaft. The spool is provided with a pair of enlargements 52 and 53. The enlargements are so spaced that by sliding the spool 50 they may block off the feed passages 41 in both of the two clutches (see FIG. 1), or the spool may be slid to the left to open the entrance or feed passage in the clutch 20 while blocking the exit port of that clutch and at the same time blocking the feed passage of the clutch 20a (see FIG. 2). Also, the spool may be slid to the right where its enlargements block the feed passage of the clutch 20 while opening the feed passage of the clutch 20a and closing the exit port of clutch 20a (see FIG. 3).

As can be seen, the pressurized fluid enters into the interior of the shaft 11 between the two enlargements and will enter into the feed passageways that are not blocked by the enlargements. When the exit ports are open, the fluid exhausts back into the hollow interior of the shaft, but on the opposite side of the enlargement from the feed and then is exhausted through openings 54 formed in the shaft. The fluid may then spill into the casing 15 and be removed through a drain (not shown) and then be brought back to the pump for pumping back into the pressure inlet of the device.

The movement of the spool is controlled by means of a lever 55 pivotally mounted upon a pivot or fulcrum 56 and pivotally connected at 57 to a cap 58 which fits over the end 51 of the spool. The end of the spool may be enlarged and fit into a groove at 59 in the cap so that the cap remains with the spool without moving axially relative thereto. Thus, by moving the lever 55 either manually or by some suitable mechanical or hydraulic moving means, the spool is shifted to the left or the right or is centered.

As shown in FIGS. 7 and 6, a vane opening or passageway 60 is provided for each pocket 30 in each rotor and communicates the bottom of the pocket to the feed passageway adjacent it. Also, each vane is provided with a detent 61 which may be in the form of a slidable bullet shaped plug 62 urged against the side of the vane by means of a spring 63, with the plug and spring fitted into a socket 64. The end 65 of the plug fits into a depression 66 formed in the side of the vane. Hence, the vane is normally retracted within its pocket as shown in FIG. 6, with the detent end 65 lodged in the depression 66 to hold the vane against outward motion.

In operation, the spool would initially be set in the position shown in FIG. 1 with both feed passages blocked off by the enlargements 52 and 53 and the shaft 12 would be rotated by means of the applied power from the power source. The rotors 21 would rotate with the shaft 11 and the vanes of each rotor would be retracted since, as the end of the vanes 31 approach the place on the chamber wall which is closest to the periphery of the rotor, the vane would be pushed radially inwards into their pockets and then be held in place by the detents 61. The spool rotates with the shaft, and may be keyed to the shaft by any suitable means, such as a tongue 67 fitted into a slot 68 in the shaft (see FIG. 1).

In this position, pressurized fluid is supplied to the interior of the shaft between the two enlargements 52 and 53, but it has no effect upon the clutches. Hence, the housings 20 and 20a are stationary as are their gears 27 and 27a and the take off shaft 13.

Next, by sliding the spool either to the left (see FIG. 2) or to the right (see FIG. 3), the feed passageways in one of the clutches is unblocked while its exit port is blocked so that pressurized fluid enters the open feed passageways past the check valves 41 and into the chamber 23. Part of the flow of pressurized fluid is diverted through the vane passages 60 so that pressure builds up behind each vane to overcome the small amount of pressure that the detent applies upon that vane and thus pushes the vane outwardly beyond the detent and causes the vane end 32 to press against the wall of the chamber 23. Thus, the vanes section off the chamber, and as further pressurized fluid enters, the relative rotation between the rotor and the chamber slows down until finally it stops because of the fluid pressure built up in that section and because of the vane pressure against the housing. Then the housing begins to rotate with the rotor. When the housing rotates, it rotates its respective gear 27 or 27a and the shaft 13.

To stop rotation of that clutch, the spool is slid in a direction which uncovers the exit ports and covers the feed passageways to permit the fluid to drain out of the chamber. Simultaneously, the vanes are pushed back into their pockets and are retained there by their detents.

This construction provides a two speed clutch arrangement. Also, the clutches are so made that the vanes are retracted when the clutch is not in use so that the vanes do not create friction or drag which reduces efficiency. In addition, the valving arrangement, being located inside the drive shaft, is compact, out of the way, easily serviced by pulling out the spool, and is inexpensive and requires a minimum number of parts.

This invention may be further developed within the scope of the following attached claim. Accordingly, it is desired that the foregoing description be read as being merely illustrative of an operative embodiment of this invention and not in a strictly limiting sense.

I claim:

A clutch comprising a housing having an internal chamber, a rotor rotatably fitted in said chamber and having a peripheral wall spaced from the internal wall defining the chamber, said internal wall being curved so that at certain places it is close to and at certain places it is remote from said peripheral wall, a radially directed vane pocket formed in the rotor and opening outwardly at the peripheral wall thereof, a vane slidably fitted into the pocket for retracting into the pocket and for radially sliding outwardly of the pocket so that its free end may contact the chamber internal wall; with the vane being of a cross-section corresponding to the pocket cross-section for closing off the pocket opening; the pocket being radially longer than the length of the vane to form a space between the bottom of the vane and the bottom of the pocket the space being closed off relative to the chamber; a pressure applying detent arranged within the rotor to press against a side of the vane to frictionally hold the vane against movement; a feed passageway formed in the rotor remote from said pocket and opening into said chamber and through which pressurized fluid may be delivered to the chamber; and a vane passageway also formed in the rotor and connecting said space at the bottom of the vane to the feed passageway, whereby pressurized fluid is delivered to the chamber through the feed passageway to fill the chamber and simultaneously a portion of the fluid is diverted through the vane passageway to said space to push radially outwardly on the bottom of the vane and thus overcome the detent pressure and press the vane outwardly against the frictional drag of the detent so that its free end contacts the chamber wall, and to tightly press the vane into said contact until the pressurized fluid is drained from the space.

References Cited in the file of this patent

UNITED STATES PATENTS

| | | |
|---|---|---|
| 1,317,415 | Baker et al. | Sept. 30, 1919 |
| 1,418,126 | Cartlidge | May 30, 1922 |
| 1,611,112 | Gates | Dec. 14, 1926 |
| 2,038,613 | Staats | Apr. 28, 1936 |
| 2,146,717 | Berger | Feb. 14, 1939 |
| 2,169,747 | Treer | Aug. 15, 1939 |
| 2,402,382 | Dodge | June 18, 1946 |
| 2,529,160 | Johnson et al. | Nov. 7, 1950 |